United States Patent Office 3,637,820
Patented Jan. 25, 1972

3,637,820
REDUCTION OF AROMATIC NITRO COMPOUNDS TO AROMATIC PRIMARY AMINES
David Dodman and John Mathers Woolley, Manchester, England, assignors to Imperial Chemical Industries Limited, London, England
No Drawing. Filed Nov. 14, 1968, Ser. No. 775,894
Claims priority, application Great Britain, Nov. 24, 1967, 53,636/67
Int. Cl. C07c 85/10, 143/56, 143/58
U.S. Cl. 260—508       13 Claims

ABSTRACT OF THE DISCLOSURE

A process for the manufacture of an aromatic primary amine by reacting in the presence of a catalyst an aromatic nitro compound and a reducing agent selected from the class consisting of:

(a) hydrogen and
(b) carbon monoxide and water or aliphatic alcohol,
at a temperature in the range of 100° to 200° C., the improvement which comprises utilizing as the catalyst, one consisting essentially of two or three heavy metals selected from the group consisting of manganese, iron, cobalt, nickel, copper, silver and cerium as their oxides, hydroxides or carbonates, the catalyst being prepared by either co-precipitation from solution or a heating together of the said heavy metals as their hydroxides or heat-unstable salts or mixtures thereof.

---

This invention relates to a process for reducing aromatic nitro compounds to primary amines, and to catalysts for use in such a process.

It has long been known that aromatic nitro compounds can be reduced to primary amines by treatment with hydrogen in presence of a catalyst such as a finely divided metal, e.g. Raney nickel or finely divided platinum. Certain easily reducible oxides for example platinum dioxide (Adam's catalyst) have also been used for such reductions, but heavy metal oxides in general are not very effective catalysts unless they are reduced to metal by treatment with hydrogen either by operating the whole process at high temperature and/or high pressures or by carrying out a pre-reduction of the catalyst at high temperatures before reducing the nitro compound.

It has now been found that certain compositions comprising oxygenated compounds of at least two heavy metals are effective in catalysing the reduction of aromatic nitro compounds to primary amines even at relatively low temperatures and pressures.

The term "heavy metal" herein denotes one of the following elements:

Titanium, vanadium, chromium, manganese, iron, cobalt, nickel, copper, germanium, zirconium, molybdenum, silver, tin, antimony, lanthanum, cerium, neodymium, tungsten, gold, mercury, thallium, lead, bismuth and thorium.

The catalysts used in the invention comprise oxides, hydroxides or carbonates of at least two heavy metals as hereinbefore defined or partial reduction products thereof and are prepared by procedures which include as an essential step either a co-precipitation from solution or a heating together of the said heavy metals as their hydroxides or heat-unstable salts or mixtures thereof.

Catalysts may, for example, be prepared by precipitating an aqueous solution of mixed heavy metal salts as the oxides, hydroxides or carbonates (including basic carbonates) or as a mixture of these, and washing and drying the precipitate.

Alternatively a catalyst may, for example, be prepared by heating an intimate mixture of the hydroxides or the nitrates, acetates, carbonates or other heat-unstable salts at their decomposition temperatures.

If desired the heating to decomposition temperature or the precipitation may be carried out in situ so that the resultant composition is immediately available to catalyst reduction of a nitro compound.

It is sometimes advantageous to partially reduce the heavy metal oxides, hydroxides or carbonates before use as a catalyst. By partial reduction we mean reduction which does not produce elementary metal in substantial amount. Carbon monoxide reduction before use as a catalyst is especially valuable.

If desired supports, e.g. pumice, asbestos, fireclay, or kieselguhr can be incorporated with the heavy metal oxides, hydroxides or carbonates to provide a supported catalyst.

Although in general the compositions comprising two of the heavy metals in relative proportions by weight of from 1:20 to 1:1 are especially effective reduction catalysts the optimum proportions for the production of the best effect depends upon the particular heavy metals present. In some cases compositions in which the proportion of one heavy metal relative to the others is as low as 1% are effective catalysts.

The catalyst used in the invention are easy to make are non-pyrophoric at ambient temperatures and many of them are cheap. They are long-lived and not easily poisoned, for example by sulphur compounds.

It is believed that the catalysts used in the invention have a fundamental lattice composed of atoms of one heavy metal and oxygen atoms or hydroxide or carbonate groups and that atoms of other heavy metals act as impurity atoms in the lattice thereby making chemical imperfections in the lattice which are responsible for the catalytic properties.

According to the invention a process for the manufacture of an aromatic primary amine comprises contacting an aromatic nitro compound with a reducing agent comprising hydrogen or comprising carbon monoxide and water or aliphatic alcohol in the presence of a catalyst comprising two or more heavy metals as hereinbefore defined as their oxides, hydroxides or carbonates or partial reduction products thereof, said catalyst having been prepared by a procedure including as a step either a co-precipitation or a heating together of the heavy metals as their hydroxides or heat unstable salts.

It is preferred to use in the process of the invention two or more of the following heavy metals as their oxides, hydroxides or carbonates or mixtures thereof:

Manganese, iron, cobalt, nickel, copper, silver, cerium.

These heavy metals provide the most effective catalysts.

Combinations of heavy metals found to be especially effective are:

silver and manganese
copper and cerium
copper and manganese
iron and manganese

The hydrogen used in the process of the invention need not be pure. Carrier or diluent gases for example nitrogen may be present in admixture with the hydrogen, and it is economically advantageous to employ mixtures containing carbon monoxide, which itself effects a partial reduction of the aromatic nitro compound. The water gas and producer gas are of particular interest.

Diluents which are normally liquid may also be present in the process of the invention and may in some cases influence the reaction which takes place. The use of water or an alcohol or mixtures thereof as a solvent or diluent is of especial importance, for example for the reduction of aromatic nitrosulphonic acids. Alcohol solvents, either alone or in admixture with water are valuable for the reduction of aromatic nitro compounds which are not soluble in water.

Water or aliphatic alcohol, besides acting as a diluent or solvent may enter into the reaction, providing a source of hydrogen, and thus when carbon monoxide and water or aliphatic alcohol (e.g. methanol, ethanol, n-propanol, isopropanol, n-butanol or iso-butanol) is used as reducing agent the presence of elementary hydrogen is unnecessary. Thus for example the reduction of aqueous solutions of aromatic nitrosulphonic acids with carbon monoxide alone in presence of a catalyst as aforesaid produces aromatic aminosulphonic acids.

In a particular embodiment of the invention therefore an aromatic aminosulphonic acid is manufactured from an aromatic nitrosulphonic acid by contacting an aqueous solution thereof with hydrogen, carbon monoxide or a mixture thereof in the presence of the catalyst.

If desired the invention may be operated continuously by passing an aromatic nitro compound in liquid phase (i.e. liquified state or in solution) and the reducing agent through a bed of the catalyst. Either fixed bed or fluid bed techniques may be adopted and as desired the flow of liquid and gas may be in the same or opposite directions through the bed. It is not necessary for the apparatus to be capable of withstanding very high pressures. The reduction of liquified nitro compounds proceeds satisfactorily at substantially atmospheric pressure i.e. in the pressure range from atmospheric up to the slightly increased pressures (for example about two atmospheres) which are usually built up inside a continuously operating plant in which this type of reaction is taking place. For the reduction of aromatic nitro-sulphonic acids in aqueous solution somewhat higher pressures (e.g. above 2 atmospheres) are preferred so that the temperature may exceed 100° C.

When carbon monoxide is present in the reducing gases in a continuously operated process the carbon dioxide by-product formed may be scrubbed out of the issuing gas and residual carbon monoxide may be recirculated through the reduction zone. Alternatively the issuing gases may be contacted with carbon (e.g. coke) at high temperature to reduce the carbon dioxide to carbon monoxide which is recirculated through the reduction zone.

The process of the invention is preferably operated at temperatures above 100° C. Above 200° C. excessive quantities of undesirable by-products are sometimes formed.

The invention provides an economic method of reducing aromatic nitro compounds to primary amines, and is especially valuable when hydrogen is used in the form of water-gas or producer gas, such gases being frequently available in chemical factories at sites where there is no immediate supply of pure hydrogen.

The invention is illustrated but not limited by the following examples in which the parts are by weight unless otherwise stated:

EXAMPLE 1

A catalyst comprising oxides of manganese and silver is prepared as follows:

1.3 parts of manganese acetate hydrate (MW 245) are dissolved in 5 parts of water, 1 part of nitric acid is added followed by a solution of 0.8 part of silver nitrate in 2.5 parts of water. The solution is absorbed on a support made by crushing unglazed earthenware, sifting and using that portion passed by an 8 mesh sieve but retained by a 20 mesh sieve. The water is removed by evaporation at 100° C. and the residue heated at 600° C. until the evolution of nitrous fumes ceases.

The catalyst so prepared is packed into a reaction column 0.8 cm. in diameter, surrounded by a heating element, which has at the top inlet feeds for nitrobenzene and reducing gas. The heating element is set to give a temperature of 150° C. Nitrobenzene and a reducing gas mixture comprising equal volumes of hydrogen and carbon monoxide are fed in simultaneously in the proportions 6,000 parts by volume of the reducing gas and 2 parts by weight of nitrobenzene per hour. From the base of the reaction column is recovered a condensate consisting of a mixture of 20% aniline and 80% unchanged nitrobenzene which may be separated by fractional distillation from traces of azo- and azoxy benzene. The carbon monoxide effluent, after removing water and carbon dioxide for example by passing over solid sodium hydroxide, and the recovered nitrobenzene may be re-cycled through the catalyst column if so desired.

EXAMPLE 2

Example 1 is repeated with hydrogen alone as the reducing gas.

Aniline is the main product of a 20% conversion of the nitrobenzene feed.

A 40% conversion of the nitrobenzene feed may be obtained by feeding in nitrobenzene at 3 ml. per hour with a faster stream of hydrogen.

EXAMPLE 3

A column of internal diameter 8 mm. and total length 1050 mm. is packed with a catalyst prepared in the following manner:

1.225 parts of manganous acetate is converted to the nitrate by heating with excess 4 M nitric acid and mixed with a solution of 0.85 part of silver nitrate in a small amount of water. The solution is mixed with 10 parts of 8–10 mesh granulated pumice stone, evaporated to dryness, and then roasted in an open vessel at 500–600° C., for a few minutes until evolution of nitrous fumes ceases. The catalyst is cooled in absence of air, then packed into the column and given a preliminary treatment with carbon monoxide at 150° C., for 1 hour.

Nitrobenzene is added at a rate of 5 ml. per hour down the column and a stream of equal volumes of hydrogen and carbon monoxide is passed down the column. The column is heated externally so that the temperature inside the column is 135–145° C. The product is collected at the bottom of the column in a receiver and passage of of the exit gases through baryta water indicated the evolution of $CO_2$. Conversion of nitrobenzene to aniline is about 30% with minor amounts of azobenzene and hydroazobenzene.

EXAMPLE 4

A catalyst based on a mixture of oxides of copper and cerium is prepared as follows:

46.5 parts of cerous nitrate and 2.85 parts of cupric nitrate trihydrate are dissolved in 1200 parts of water and treated with 5% sodium hydroxide solution until alkaline to Brilliant Yellow paper. The precipitate is allowed to settle, the supernatant liquor decanted and the residue washed repeatedly with water by decantation until the supernatant liquor no longer shows an alkaline reaction. 190 parts of pumice granules (size 22–60 mesh) are stirred in and the slurry is then filtered. The residue is washed on the filter, firstly with methyl alcohol, then with acetone and dried by heating at 100° C. for some hours.

The catalyst is treated prior to use by heating at 160° C. in an atmosphere of carbon monoxide until evolution of carbon dioxide slows or ceases completely and is then stored in the absence of oxygen.

10 parts of this catalyst are mixed with 12.3 parts of nitrobenzene, 300 parts of water, 21.2 parts of sodium carbonate and 0.035 part of p-dodecyl benzene sulphonic acid and charged to an autoclave. The autoclave is sealed and pressurised to 100 atmospheres with a mixture of equal parts of hydrogen and carbon monoxide. Agitation is commenced and the autoclave and contents heated to 150° C. and kept at 150° C. for eight hours. The autoclave is then cooled and vented and the contents discharged.

Acidification of the product solution and titration with standard sodium nitrite solution gave a yield of 41% of aniline.

EXAMPLE 5

A catalyst based on a mixture of oxides of silver and manganese is prepared as described later in Example 11.

10 parts of this catalyst are mixed with 5 parts of dinitrotoluene (80:20 mixed isomers), 59 parts of isopropanol and 25 parts of water and charged to an autoclave. The autoclave is sealed and pressurised to 102 atmospheres with a mixture of equal parts of hydrogen and carbon monoxide. Agitation is commenced and the autoclave and contents heated to 140° C. and kept at 140° C. for 8 hours. The autoclave is then cooled and vented and the contents discharged.

Solvents are removed by evaporation and the residue is found by analysis to contain 96.6% of tolylene diamine (mixed isomers).

EXAMPLE 6

By a procedure similar to that of Example 5 using suitable reaction times and temperatures, the following nitro compounds are reduced to the corresponding amines:

m-Dinitrobenzene, 4-nitrodiphenyl, p-nitroanisole, m-nitroethylbenzoate, p-nitroacetophenone, p-nitroaniline, α-nitronaphthalene.

EXAMPLE 7

A catalyst based on a mixture of oxides of copper and manganese is prepared as follows:

18 parts of manganese acetate hydrate are dissolved in water and 30 parts of concentrated nitric acid are added. 18 parts of cupric nitrate hydrate are then added as a solution in water and the mixture is treated with sodium hydroxide solution until the suspension is alkaline to Brilliant Yellow paper. The precipitate is allowed to settle, the supernatant liquor decanted and the residue washed repeatedly with water by decantation until the supernatant liquor no longer gives an alkaline reaction. 90 parts of pumice granules (size 22–60 mesh) are stirred in and the resulting slurry is filtered. The residue is washed on the filter, firstly with methyl alcohol then with acetone and dried at 100° C. to constant weight.

10 parts of this catalyst are mixed with 10 parts of p-chloronitrobenzene and 103.5 parts of 1,4-dioxan and charged to an autoclave. The autoclave is sealed and pressurised to 100 atmospheres with hydrogen. Agitation is commneced and the autoclave and contents heated to 150° C. and kept at 150° C. for 3 hours. The autoclave is then cooled and vented and the contents discharged.

Gas-liquid chromatography of the product shows a 100% conversion of the nitro compound to p-chloroaniline.

EXAMPLE 8

By a procedure similar to that of Example 7 the following nitro compounds are reduced to the corresponding amines:

3,4-dichloronitrobenzene, 2,4-dinitrochlorobenzene, p-bromonitrobenzene.

EXAMPLE 9

A catalyst based on a mixture of oxides of copper and manganese is prepared as follows:

2.23 parts of manganese acetate tetrahydrate are dissolved in water and 4 parts of concentrated nitric acid are added. 1.9 parts of cupric nitrate trihydrate are then added as a solution in water and the mixture is treated with sodium hydroxide solution until the suspension is alkaline to Brilliant Yellow paper. The precipitate is allowed to settle, the supernatant liquor decanted and the residue washed repeatedly with water until the supernatant liquor no longer gives an alkaline reaction. 10 parts of potassium bisulphate are added to the suspension and the whole is evaporated to dryness.

The catalyst is mixed with a solution of 10 parts of m-chloronitrobenzene in 79 parts of isopropanol and charged to an autoclave. The autoclave is sealed and pressurised to 100 atmospheres with a mixture of equal parts of hydrogen and carbon monoxide. Agitation is commenced and the autoclave and contents heated to 150° C. and kept at 150° C. for 6 hours. The autoclave is then cooled and vented and the contents discharged.

Gas-liquid chromatography of the product shows an 83% conversion of the nitro compound to m-chloroaniline.

EXAMPLE 10

A catalyst based on a mixture of oxides of lead and manganese is prepared as follows:

33.1 parts of lead nitrate and 57.2 parts of manganese acetate tetrahydrate are dissolved in water and precipitated by the addition of 26.67 parts of sodium hydroxide in water. Sodium hypochlorite liquor is added until starch iodide paper showed an excess to be present. During the addition of sodium hypochlorite, the suspension is kept alkaline by the addition of sodium hydroxide liquor.

25 parts of kieselguhr are added and after mixing, the suspension is filtered and the residue is dried at 100° C.

10 parts of the catalyst are mixed with 2 parts of 2-nitrodiphenyl and 86.8 parts of 1,2,4-trichlorobenzene in a reactor and a slow stream of hydrogen is passed through the mixture. The reactor and contents are heated to 195° C. and kept at 195–205° C. for a total time of 11½ hours.

After cooling, the catalyst is removed by filtration and extracted with boiling acetone to give 0.3 part of carbazole. Evaporation of the filtrate gives a brown solid. This is washed with petrol ether and dissolved in acetone. Addition of water precipitates more carbazole giving a total yield of 63.6%.

EXAMPLE 11

A catalyst based on a mixture of oxides of silver and manganese is prepared as follows:

16.25 parts of manganese acetate hydrate (MW 245) are dissolved in water and 18.75 parts of concentrated nitric acid are added. 10.675 parts of silver nitrate are then added as a solution in water and the resulting solution is treated with 5% caustic soda solution until the suspension reacts strongly alkaline. The precipitate is allowed to settle, the supernatant liquor decanted and the residue washed repeatedly with water by decantation until the supernatant liquor no longer shows an alkaline reaction. 80 parts of pumice granules (size 22–60 mesh) are stirred in and the resulting slurry is filtered. The residue is washed on the filter, firstly with methyl alcohol then with acetone and dried by heating at 100° C. for several hours.

The catalyst is treated prior to use by heating at 160° C. in an atmosphere of carbon monoxide and stored in the absence of oxygen.

10 parts of the supported catalyst prepared as above are mixed with a solution of 10 parts of the sodium salt of m-benzene sulphonic acid dissolved in 100 parts of water and charged to an autoclave. The autoclave is sealed and pressurised to 100 atmospheres with hydrogen. Agitation is commenced and the autoclave and contents heated to 150° C. and kept at 150° C. for six hours. The autoclave is allowed to cool and then vented and the contents discharged. The suspension is basified with sodium carbonate and the catalyst removed by filtration. Acidification of the product solution and titration of a portion with standard sodium nitrite solution at 0–5° C. showed the yield of metanilic acid to be 92.2%.

EXAMPLE 12

A catalyst based on a mixture of oxides of copper and manganese is prepared as follows:

6 parts of manganous acetate hydrate are dissolved in water and 7.5 parts of concentrated nitric acid are added.

6 parts of cupric nitrate hydrate are then added as a solution in 100 parts of water and the resulting solution is treated with 5% sodium hydroxide solution until the suspension is alkaline to Brilliant Yellow paper. The precipitate is allowed to settle, the supernatant liquor decanted and the residue washed repeatedly with water by decantation until the supernatant liquor no longer gives an alkaline reaction to Brilliant Yellow paper. 30 parts of pumice granules (size 22–60 mesh) are stirred in and the resulting slurry is filtered. The residue is washed on the filter, firstly with methyl alcohol, then with acetone and dried by heating at 100° C. for some hours.

The catalyst is treated prior to use by heating at 160° C. in an atmosphere of carbon monoxide.

10 parts of the supported catalyst prepared as above are mixed with a solution of 10 parts of the sodium salt of m-nitro-benzene sulphonic acid and 9 parts of sodium carbonate in 100 parts of water and charged to an autoclave. The autoclave is sealed and pressurised to 100 atmospheres with a mixture of equal parts of hydrogen and carbon monoxide. Agitation is commenced and the autoclave and contents are heated to 150° C. and kept at 150° C. for eight hours. The autoclave is allowed to cool. It is then vented and the contents are discharged. The neutral suspension is basified with sodium carbonate and the catalyst removed by filtration. Acidification of the product solution and titration with standard sodium nitrite solution gave a yield of metanilic acid of 91.7%.

EXAMPLE 13

By a procedure similar to that of Example 12 the following nitro compounds are reduced to the corresponding primary amines:

1-nitronaphthalene-5-sulphonic acid, sodium salt.
1-nitronaphthalene-6- and -7-sulphonic acids, sodium salts.
1-nitronaphthalene-8-sulphonic acid, sodium salt.

EXAMPLE 14

10 parts of the supported copper/cerium oxide catalyst prepared as described in Example 4 are mixed with a solution of 10.3 parts of the sodium salt of 1-nitronaphthalene-3,6,8-trisulphonic acid in 100 parts of water and charged to an autoclave. The autoclave is sealed and pressurized to 100 atmospheres with a mixture of equal parts of hydrogen and carbon monoxide. Agitation is commenced and the autoclave and contents heated to 180° C. and kept at 180° C. for 12 hours. The autoclave is then cooled and vented and the contents discharged. The suspension is basified with sodium carbonate and the catalyst removed by filtration. Acidification of the product solution and titration with standard sodium nitrite solution gave a yield of 99% of Koch acid (1-naphthylamine-3,6,8-trisulphonic acid).

When the above procedure is repeated but heating the autoclave and contents at 150° C. instead of 180° C. reduction of the nitro compound is very slow.

EXAMPLE 15

A catalyst based on a mixture of oxides of silver and manganese is prepared as in Example 11 but is not treated with carbon monoxide prior to use.

10 parts of this catalyst are mixed with a solution of 10.3 parts of the sodium salt of 1-nitronaphthalene-3,6,8-trisulphonic acid in 100 parts of water and charged to an autoclave. The autoclave is sealed and pressurized to 100 atmospheres with a mixture of equal parts of hydrogen and carbon monoxide. Agitation is commenced and the autoclave and contents heated to 150° C. and kept at 150° C. for 3 hours. The autoclave is then cooled and vented and the contents discharged. The suspension is basified with sodium carbonate solution and the catalyst removed by filtration. Acidification of the product solution and titration with standard sodium nitrite solution at 0–5° C. gave a yield of Koch acid of 100%.

EXAMPLE 16

2 parts of manganous acetate (MW 245) and 2 parts of cupric nitrate trihydrate are mixed and dissolved in 25 parts of water and the solution added to a solution of 5 parts of sodium carbonate in 25 parts of water with mixing. The resulting suspension is mixed with a solution of 10.3 parts of the sodium salt of 1-nitro-naphthalene-3,6,8-trisulphonic acid in 50 parts of water and the whole is charged to an autoclave.

The autoclave is sealed and pressurized to 100 atmospheres with a mixture of equal parts of hydrogen and carbon monoxide. Agitation is commenced and the autoclave and contents heated to 150° C. and kept at 150° C. for 3 hours. The autoclave is then cooled and vented and the contents discharged. The suspension is filtered to remove catalyst.

Analysis by diazotisation indicates a yield of Koch acid of 91%.

EXAMPLE 17

0.488 part of manganous acetate hydrate and 0.417 part of silver nitrate are dissolved in 50 parts of water and the solution added to a solution of 0.3747 part of sodium hydroxide in 75 parts of water with mixing. The resulting suspension is mixed with a solution of 25.6 parts of the sodium salt of 1-nitronaphthalene-3,6,8-trisulphonic acid in 100 parts of water and the whole is charged to a glass liner and placed in an autoclave.

The autoclave is sealed and pressurized to 100 atmospheres with hydrogen. Agitation is commenced and the autoclave and contents heated to 150° C. and kept at 150° C. for 3 hours. The autoclave is then cooled and vented and the contents discharged. The suspension is filtered to remove catalyst.

Analysis by diazotisation indicates a yield of Koch acid of 91%.

EXAMPLE 18

By the procedure of Example 17, an aqueous solution of p-nitrotoluene sulphonic acid, neutralized with sodium hydroxide may be reduced to give sulphanilic acid.

EXAMPLE 19

A catalyst is prepared as follows:
13.9 g. of ferrous sulphate crystals and 14.5 g. of cobalt nitrate are dissolved in 150 ml. of water and 24 g. of pumice is added. The suspension is made alkaline to Brilliant Yellow paper with sodium hydroxide liquor. The precipitate is washed by decantation until alkali free and filtered. After washing the filter cake with 2× 100 ml. of water and 2× 100 ml. of acetone, it is dried at 110° C. and ground to pass a 60 mesh sieve (BS).

25 g. of this catalyst are placed in a fluid bed reactor and pretreated with carbon monoxide at 250° C. During 90 mins. 5 g. of nitrobenzene are fed into the reactor evenly together with hydrogen at a rate of 5 litres per hour. The temperature of the bed is maintained at 220° C. throughout the addition. A 10% conversion of nitrobenzene to aniline takes place.

EXAMPLE 20

A catalyst containing manganese, nickel and cobalt in an approximate ratio of 1:0.5:0:5 is prepared as follows:
11.1 g. manganous sulphate, 6.5 g. nickel sulphate and 7.2 g. cobalt nitrate are dissolved in 200 ml. water, with agitation, 30 g. of pumice (22–60 mesh) is added and the suspension is treated with 4 ml. of caustic soda liquor (70° tw.). 5 ml. of sodium hypochlorite liquor is added and after stirring for 30 mins., the suspension is filtered. The filter cake is washed with 4× 100 ml. water, 2× 100 ml. of acetone, dried at 100° C. and then ground to pass a 60 mesh sieve (BS).

When used in the process of Example 19, the catalyst gives a 5–10% conversion of nitrobenzene to aniline.

EXAMPLE 21

A catalyst containing cerium and iron in the approximate ratio 1:1 is prepared by dissolving 12.3 g. of cerous chloride and 13.9 g. of ferrous sulphate in 200 ml. water, adding 38 g. of pumice (comprising 12 g. of 60–100 mesh, 12 g. of 100–150 mesh and 14 g. of 150–200 mesh material), and making alkaline to Brilliant Yellow paper with caustic soda liquor. The product is washed with water by decantation until alkaline free and separated by filtration. The filter cake is washed with 2× 100 ml. water, 2× 100 ml. acetone and dried at 100° C.

When used in the process of Example 19, the catalyst gives a 5–10% conversion of nitrobenzene to aniline.

EXAMPLE 22

In place of the catalyst used in Example 1 there is used a catalyst composition prepared as follows:

3 pts. of ferric nitrate $Fe(NO_3)_36H_2O$ and 0.3 part of cupric nitrate $Cu(NO_3)_23H_2O$ are dissolved in 200 parts of water. With stirring a 5% solution of sodium hydroxide is added until the suspension reacts strongly alkaline. The precipitate is allowed to settle and is washed by decantation until alkali free, 10 parts of pumice granules (22–60 mesh) are stirred in and the suspension is filtered. After washing with de-ionised water the composition so obtained is dried to constant weight at 100° C.

A conversion of 30% of the nitrobenzene to aniline is obtained.

EXAMPLE 23

In place of the catalyst of Example 22 there is used a catalyst composition prepared as follows:

1.45 parts manganese acetate $(Mn(C_2H_3O_2)_24H_2O)$ and 20 parts of ferric nitrate $(Fe(NO_3)_36H_2O)$ are stirred in 1000 parts of water containing 5 parts of ntric acid. When solution is complete a 5% solution of sodium hydroxide is added until the suspension is strongly alkaline. After washing alkali free with water by decantation 40 parts of pumice granules (22–60 mesh) are added with stirring. The suspension is filtered, washed and dried to constant weight at 100° C.

A conversion of Ca. 30% of the nitrobenzene to aniline is obtained.

EXAMPLE 24

10 parts of the copper/manganese catalyst described in Example 7 are mixed with a solution of 2 parts of nitrobenzene in 49 parts of 95% ethyl alcohol and charged to an autoclave. The autoclave is sealed and pressurized to 80 atmospheres with carbon monoxide. Agitation is commenced and the autoclave and contents heated to 140° C. and kept at 140° C. for 5 hours. The autoclave is then cooled and vented, the contents are discharged and then solvent is removed. Titration indicates a yield of aniline of 28%.

EXAMPLE 25

The procedure of Example 11 is repeated using carbon monoxide for the reduction instead of hydrogen. Analysis shows the yield of metanilic acid to be 87%.

In the above examples various combinations of heavy metal oxides, hydroxides or carbonates are described as effective catalysts for the reduction of aromatic nitro compounds to primary amines. Other combinations may be used in place of those described. In particular the following combinations are effective:

Nickel+manganese
Silver+titanium
Lead+vanadium
Tin+manganese
Bismuth+manganese
Tungsten+cerium
Thorium+cerium
Gold+manganese
Molybdenum+cerium
Cobalt+chromium
Copper+lanthanum
Silver+lead+manganese
Mercury+lead+manganese
Thallium+lead+manganese

We claim:
1. In a process for the manufacture of an aromatic primary amine by reacting in the presence of a catalyst an aromatic nitro compound and a reducing agent selected from a class consisting of:
   (a) hydrogen and
   (b) carbon monoxide and water or aliphatic alcohol,
at a temperature in the range of 100° to 200° C., the improvement which comprises utilizing, as the catalyst, one consisting essentially of two or three heavy metals selected from the group consisting of manganese, iron, cobalt, nickel, copper, silver and cerium as their oxides, hydroxides or carbonates, the catalyst being prepared by either a co-precipitation from solution or a heating together of the said heavy metals as their hydroxides or heat-unstable salts or mixtures thereof.

2. Process according to claim 1 wherein the catalyst consists essentially of a pair of heavy metals selected from the group of pairs consisting of—
   (a) silver and manganese
   (b) copper and cerium
   (c) copper and manganese
   and
   (d) iron and manganese
as their oxides, hydroxides or carbonates.

3. Process according to claim 1 wherein the heavy metal oxides, hydroxides or carbonates are partially reduced by means of carbon monoxide before use as a catalyst.

4. Process according to claim 1 wherein two heavy metals are used in relative proportions by weight of 1:20 to 1:1.

5. Process according to claim 2 wherein the heavy metals are used in relative proportions by weight of 1:20 to 1:1.

6. Process according to claim 1 wherein the reducing agent is hydrogen in admixture with carbon monoxide.

7. Process according to claim 2 wherein the reducing agent is hydrogen in admixture with carbon monoxide.

8. Process according to claim 1 wherein the corresponding aromatic aminosulphonic acid is manufactured from an aromatic nitrosulphonic acid by contacting an aqueous solution thereof with a reducing agent selected from the group consisting of hydrogen, carbon monoxide or a mixture thereof in the presence of the catalyst.

9. Process according to claim 2 wherein the corresponding aromatic aminosulphonic acid is manufactured from an aromatic nitrosulphonic acid by contacting an aqueous solution thereof with a reducing agent selected from the group consisting of hydrogen, carbon monoxide or a mixture thereof in the presence of the catalyst.

10. Process according to claim 1 wherein a liquified aromatic nitro compound is reduced at substantially atmospheric pressure.

11. Process according to claim 2 wherein a liquified aromatic nitro compound is reduced at substantially atmospheric pressure.

12. Process according to claim 8 operated at a pressure above 2 atmospheres.

13. Process according to claim 9 operated at a pressure above 2 atmospheres.

References Cited
UNITED STATES PATENTS 2,823,235   2/1958   Graham et al. _____ 260—580
3,222,400   12/1965  Suter et al. _____ 260—580 X CHARLES B. PARKER, Primary Examiner
R. L. RAYMOND, Assistant Examiner U.S. Cl. X.R.

252—471, 476; 260—471 R, 575, 580